United States Patent [19]
French et al.
[11] 3,925,610
[45] Dec. 9, 1975

[54] GRAPHIC COMMUNICATIONS TABLET

[75] Inventors: Joseph Charles French, North Plainfield, N.J.; Anant Kumar Nigam, Fairfield, Conn.; Gerhard Martin Sessler, Summit, N.J.

[73] Assignee: Bell Telephone Laboratories, Incorporated, Murray Hill, N.J.

[22] Filed: Aug. 12, 1974

[21] Appl. No.: 496,530

[52] U.S. Cl. .................................................. 178/18
[51] Int. Cl.$^2$ ...................... G08C 21/00; G11B 9/02; H04R 19/00
[58] Field of Search .......... 178/18, 19, 20, DIG. 10; 179/111 E, 100.41 B; 340/365 C; 307/88 ET

[56] References Cited

UNITED STATES PATENTS

| | | | |
|---|---|---|---|
| 3,445,824 | 5/1969 | Fulenwider | 307/88 ET |
| 3,653,038 | 3/1972 | Webb et al. | 340/365 C |
| 3,663,768 | 5/1972 | Madsen et al. | 179/111 E |

OTHER PUBLICATIONS

"Foil Electrets Provide Simpler Touch-Tone Dials," no author, Bell Labs Record for Mar., 1973, p. 94.

*Primary Examiner*—Thomas A. Robinson
*Attorney, Agent, or Firm*—G. E. Murphy; W. Ryan

[57] ABSTRACT

A tablet or transducer, for use in a graphical communications system, which comprises a rectangular array of electret transducer elements responsive to the writing pressure of a stylus, such as an ordinary ballpoint pen. The array is formed by a selectively metallized elastic electret film mounted in spaced juxtaposition with a selectively metallized backplate. Performance characteristics are enhanced by ridges or separators between metallized areas and by field effect transistor signal detector circuits. An embodiment including a compliant media between the electret film and the backplate for supplying an output signal whose magnitude is proportional to writing pressure is also disclosed.

10 Claims, 7 Drawing Figures

GRAPHIC COMMUNICATIONS TABLET

BACKGROUND OF THE INVENTION

This invention relates to apparatus for producing electrical signals representing graphic information and more particularly to transducers for producing signals which are coded according to the position of a writing stylus upon a writing surface. Transducers of the general type with which the present invention is concerned are designed to introduce graphic information, in the form of electrical signals, into a communications system primarily for the purpose of transmitting the information to a location remote from the transducer where it can be reproduced or entered into a data processing system. Graphical communications systems are becoming increasingly important, encompassing such uses as teaching aids and the remote verification of signatures.

DESCRIPTION OF THE PRIOR ART

Various apparatus have been employed as transducers in graphical communications systems. The means utilized to produce an electrical signal indicative of the planar position of a stylus on a writing surface have included a pantograph-like mechanical linkage coupling a writing stylus to variable electrical means, such as a variable resistor; apparatus which depends on the electrical contact between the writing stylus and a conductive or resistive writing surface; and apparatus in which a signal is coupled between the stylus and the writing surface. The last-mentioned type of transducer has employed a variety of signals, including rf, ultrasonic, and light.

These prior art devices suffer from several disadvantages. Mechanically, many of the prior art transducers have been cumbersome, requiring a relatively large writing stylus and mechanical or electrical connection between the stylus and transducer writing surface. Moreover, much of the prior art has not provided structure rugged enough to be of use in applications where the device is operated by other than trained personnel. From an electrical standpoint, the prior art devices have not always provided the desired resolution and have often been subject to excessive distortion or error signals. Further, in the situation where a graphic communications system interfaces with a digital computer, the circuitry required to digitize the transducer output has often been complex and costly.

Electret transducers, which also define prior art with respect to this invention, are a type of electrostatic transducer which employs an electret film as a transducer dielectric material. Since an electret film exhibits a permanent charge, sizeable ouputs can be developed in response to relative displacement of the transducer elements without the use of an applied bias signal. In the past, electret transducers have been utilized as electroacoustic and electromechanic transducers. Single element electret transducers have been primarily used as microphones, and have also been utilized as tactilely operated electrical switches or keys. Two-dimensional arrays of electret transducers formed from a single sheet of electret material have found use as keyboard switching arrangements. See, e.g., U.S. Pat. No. 3,668,417, issued June 6, 1972, to G. M. Sessler and J. E. West, and U.S. Pat. No. 3,750,149, issued July 31, 1973, to G. M. Sessler, J. E. West and A. E. Hirsch, Jr. In addition, two-dimensional arrays of electret transducers have found use in ultrasonic imaging systems. See, for example, U.S. Pat. No. 3,736,552, issued to G. M. Sessler and K. J. Taylor on May 29, 1973, and the application of A. K. Nigam and G. M. Sessler, Ser. No. 241,784, filed Apr. 6, 1972.

It is therefore an object of this invention to provide an economical graphic communications tablet which is mechanically rugged and provides an electrical signal which reliably indicates the position of an electrically and mechanically isolated writing stylus, such as an ordinary ballpoint pen, upon a writing surface.

It is a further object of this invention to employ a foil electret transducer array which utilizes an electret diaphragm as the writing surface of a graphical communications tablet.

It is yet another object of this invention to provide a graphical communications tablet which produces electrical signals which may be transmitted to a remote location via conventional communications apparatus, including conventional telephone lines.

It is yet another object of this invention to provide a graphical communications tablet which is capable of transmitting not only the spatial coordinates of the graphical data traced out on the tablet surface, but also the writing pressure which is employed at each point along the written path.

SUMMARY OF THE INVENTION

To achieve these goals, it is in accordance with the present invention to employ a foil electret diaphragm and supporting structure to effect an electret transducer array which permits a writing stylus of dimensions comparable to a common ballpoint pen to produce a reliable electronic representation of graphical data traced out on the surface of the array.

Each embodiment of the present invention employs an electret diaphragm and a backplate structure in which overlapping or juxtaposed metallized areas of the backplate and the diaphragm from a plurality of pressure-sensitive transducers. By arranging the elements so as to form a predetermined configuration, preferably a planar rectangular array, the position of the writing stylus can be determined or followed by detecting the electrical output signals of the individual transducer elements. A series of specially structured partitions or ridges are interposed between the individual transducer elements to perform two important functions. First, the ridge structure supports the electret diaphragm such that a plurality of tranducers is not activated when an object larger than the tip of the writing stylus contacts the tablet surface. Thus, if an object, such as the operator's hand, is placed against the writing surface, no erroneous output signals will be produced. Secondly, the ridge structure is proportionately dimensioned to enhance the tablet performance at very slow writing speeds.

In one embodiment of the present invention, a compliant material, such as rubber, is sandwiched between the electret diaphragm and the backplate structure. This embodiment supplies an output signal not only indicative of the position of the writing stylus, but also representative of the writing pressure exerted at each point along the written path. This additional information may be advantageously used in applications such as signature verification.

DETAILED DESCRIPTION

Figure 1:
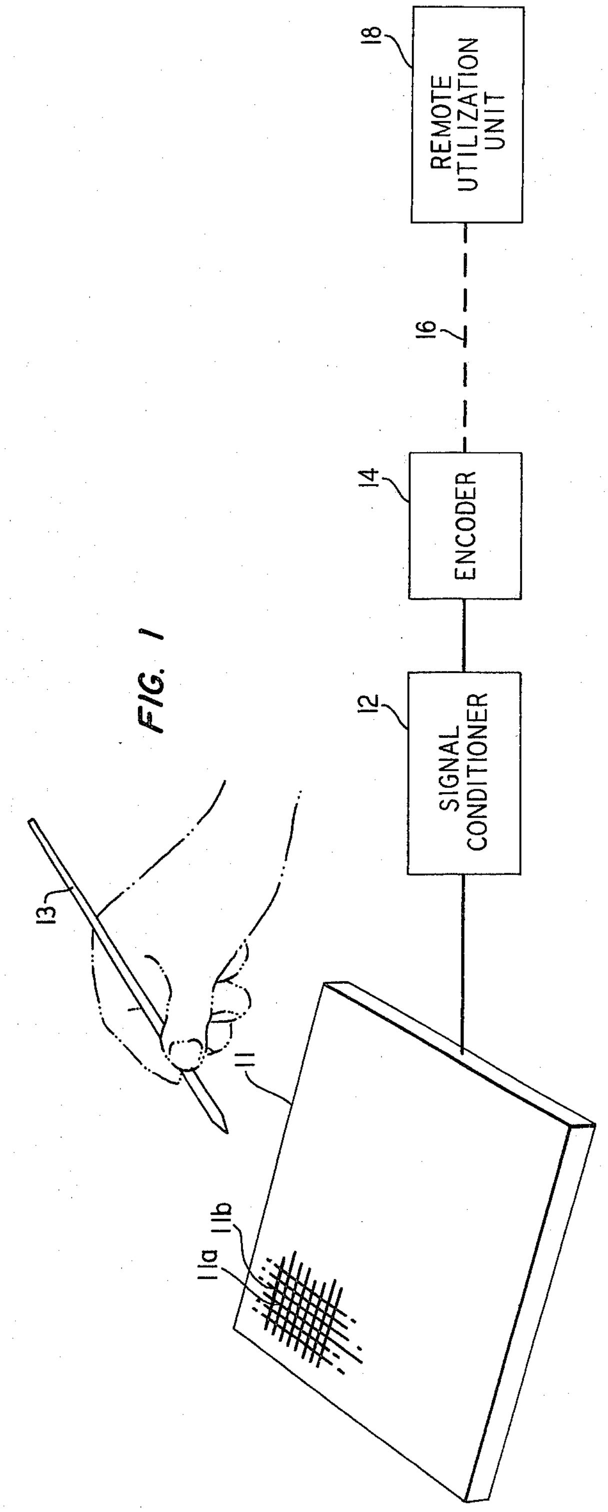
FIG. 1 is a block diagram representative of a graphical communications system which may advantageously employ a transducer in accordance with the present invention.

FIG. 1 depicts a basic graphic information system which may advantageously employ the present invention. Graphic tablet 11 is comprised of an array or mosaic of elemental pressure-sensitive electret transducers. Each elemental transducer of tablet 11, typified by elements 11*a* and 11*b*, is electrically connected to signal conditioner unit 12 and generates an electrical signal in response to the writing pressure of writing stylus 13. Unit 12 may be a physically separate unit, as shown, or alternatively may be an integral part of transducer 11. In any case, unit 12 normally contains the impedance transformation circuits necessary to interface the high impedance transducer elements with the lower impedance circuitry of the graphic communications system and also contains the detector circuits necessary to determine which elemental area of tablet 11 originated the detected signal. In addition, unit 12 may contain a variety of circuitry to further condition the transducer output signals, e.g., amplifiers to provide the gain necessary to make the transducer compatible with the particular transmission system employed. Regardless of the apparatus employed within signal conditioner unit 12, the output signal of the unit is an electrical signal coded to represent the sequence of positions or spatial coordinates of those transducer elements depressed by writing stylus 13.

Encoder 14 senses the output of signal conditioner unit 12 and converts the electrical signal into the proper format for transmission over communications link 16. It will be understood by those skilled in the art that the apparatus of encoder 14 is totally dependent upon the transmission technique employed to transmit the information over communications link 16. That is, if communications link 16 is a pair of telephone wires and pulse-coded modulation is the chosen transmission technique, encoder 14 would include a conventional pulse code modulation transmitter. Since, however, the graphic information will often be employed by a data processing system, the embodiment of encoder 14 will often include means for converting the graphical signal to a binary coded digital format acceptable to a computer. In an embodiment of this invention, the graphical data written on a 1,024 × 1,024 element tablet can be encoded in a 10-bit binary coded digital format for transmission to a digital processing system via conventional telephone circuitry.

Communications link 16 may be any suitable media for coupling the data encoded by encoder 14 to a remote facility for subsequent utilization. Thus, it should be well understood that many links other than the previously mentioned conventional telephony link are possible, e.g., a conventional rf communications link, a modulated or coded light transmission link, or an ultrasonic transmission link.

Remote utilization unit 18 includes apparatus which receives the encoded graphical data and transforms it into a form which is suitable for the application at hand. Thus, if the graphical data are to be visually displayed on a real-time basis, utilization unit 18 would include decoding apparatus and display apparatus, e.g., an x-y plotter or cathode ray tube.

In many applications, utilization unit 18 will either optionally or primarily provide for the analysis or storage of the graphical data by conventional data processing apparatus. Of course, once the graphical data are introduced into the data processing system, any number of well-known operations may be performed, e.g., comparing the graphical data received with a record already maintained, calculating any number of mathematical properties of the received graphical data, or generation of new data based on the graphical data received. In any case, it will be realized that utilization unit 18 may take any form which transfers the encoded data received from communications link 16 into either a temporary or permanent record which suits the exact need of the remote facility.

Figure 2:
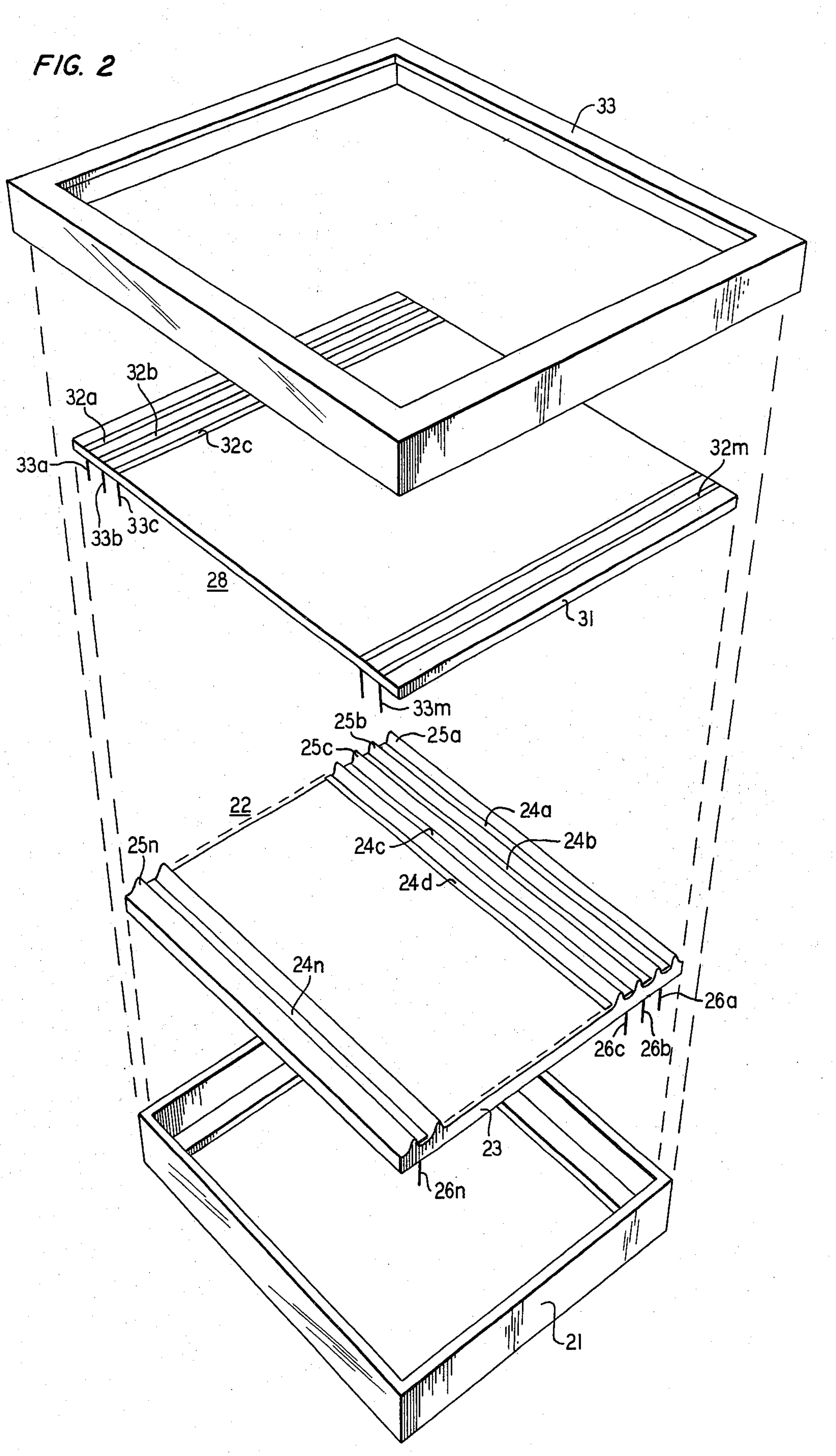
FIG. 2 is an exploded view of a graphic communications tablet constructed in accordance with this invention.

FIG. 2 depicts an exploded view of one embodiment of a graphic communications tablet or transducer constructed in accordance with this invention. The transducer employs a subdivided backplate 22 formed of a rigid layer of insulating material 23 with a plurality of conductive areas 24*a*, 24*b*, 24*c* through 24*n* on its surface. Although the example of FIG. 2 only shows five such areas, it should be understood that the number of conductive areas is limited only by physical considerations which shall become apparent upon understanding the invention.

Ridges, typified in FIG. 2 by 25*a*, 25*b*, and 25*c*, which are either formed as an integral part of the insulating layer 23 or are a separate network of insulating strips, are located between each conductive area 24. As will be realized upon understanding the relationship between the transducer electrical output signal and the applied mechanical writing action, described in subsequent paragraphs, the ridges are proportionately dimensioned to optimize tablet performance.

Each conductive area 24 has associated with it an electrically conductive lead 26, preferably extending through insulating layer 23 for connection to the electronic circuitry of the graphical data system. In general, conductive areas 24 may assume any desired configuration. Preferably, however, parallel strips are used, so that with a comparable arrangement on the transducer diaphragm a rectangular matrix will be formed in which each transducer element represents a particular planar or x-y coordinate. In the assembled transducer, backplate 22 is seated in a supporting member or the like, such as depicted by retainer 21. Retainer 21 is preferably recessed in order to support backplate 22 while simultaneously providing sidewall structure to protect the edges of the assembled transducer. If electrostatic shielding is desired, retainer 21 may be made of conductive material. Conductive leads 26 may extend through an aperture in retainer 21 to facilitate connection to the circuitry of the graphic communications system.

Elastic diaphragm 28, substantially the same size as backplate 22 and held in close contact with it, includes a thin electret film 31 which supports on its surface a number of areas of thin conductive material 32*a* through 32m. Although the conductive areas may be deposited on the surface of film 31 in any desired pattern, it is advantageous for them to be arranged in a pattern of parallel strips substantially identical to the pattern of backplate 22. Elastic diaphragm 28 is supported over the surface of backplate 22 by frame member 33 which is preferably arranged to mate with retainer 21. Frame 33 is normally fabricated of insulating material so that the metallized areas 32 covered by the retainer are not electrically connected together. Connection to each metallized strip 32 is made via leads 33 aligned with each of the strips 32 and brought out either through an aperture provided in retainer 21 or through an aperture provided in frame 33. Strips 32 may be extended on the connection side to assure a positive connection. The entire tablet may be electrostatically shielded, if desired, by covering the diaphragm with a thin metal-coated insulating layer (not shown in FIG. 2) and utilizing a metallic material for frame 33. It has been found that such an arrangement not only provides electrical shielding for the tablet, but the additional diaphragm covering also tends to extend the life of the tablet by preventing abrasion of the tablet surface by the writing stylus.

Figure 3:
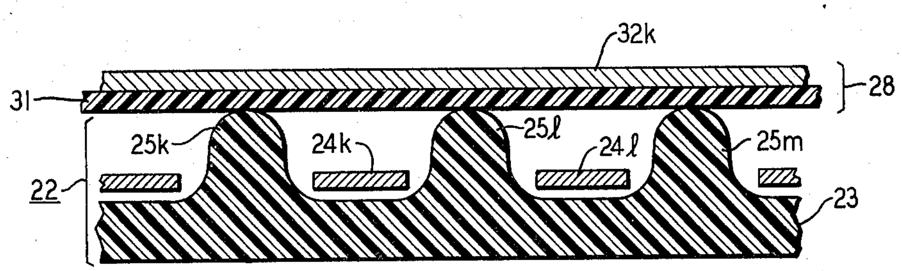
FIG. 3 depicts a cross-sectional view of a portion of a graphic communicatiolns tablet constructed in accordance with this invention.

FIG. 3, not drawn to scale, depicts a cross-sectional view of a small portion of an assembled transducer. As shown in FIG. 3, diaphragm 28 is placed over backplate 22, with conductive strips 32 facing away from strips 24 on backplate 22 such that the strips 24 on backplate 22 are substantially perpendicular to strips 32 on diaphragm 28. Each overlapping area constitutes a separate transducer element, and the individual $n \times m$ elements are aligned in a rectangular array. For convenience, the metal strips 24 on the backplate may be designated as conductive rows, and the metallic strips 32 on the diaphragm may be designated as conductive columns.

In one application, a multi-element graphic communications transducer with the elements in a 1,024 $\times$ 1024 matrix array employs a square backplate with dielectric substrate 23 from 1 centimeter thick, not including ridges 25, and 30 centimeters on edge. Each conductive strip 24 on backplate 22 is approximately 2,000 Angstroms thick, deposited thereon by photoetching or the like. In this embodiment, the strips are approximately 0.3 millimeters wide and essentially extend over the full width of substrate 23. Conductive strips 24 are spaced apart 0.33 millimeters. Ridges 25, which occupy the spaces between conductive strips 24, are approximately 0.03 millimeters wide and 25 micrometers high. Elastic diaphragm 28 employs a 12 micrometer thick sheet 31 of flourocarbon plastic material such as that marketed commercially under the name Teflon FEP permanently charged to approximately $3 \times 10^{-8}$ coulombs/cm². Alternatively, a similar dimensioned polyester material, such as that marketed under the names Mylar A or Mylar C, may be used. Thus, in this tablet, each elemental transducer element is substantially 0.3 millimeters square, a size which has been found to be well adapted to writing styli having the dimensions of an ordinary ballpoint pen.

Figure 4:
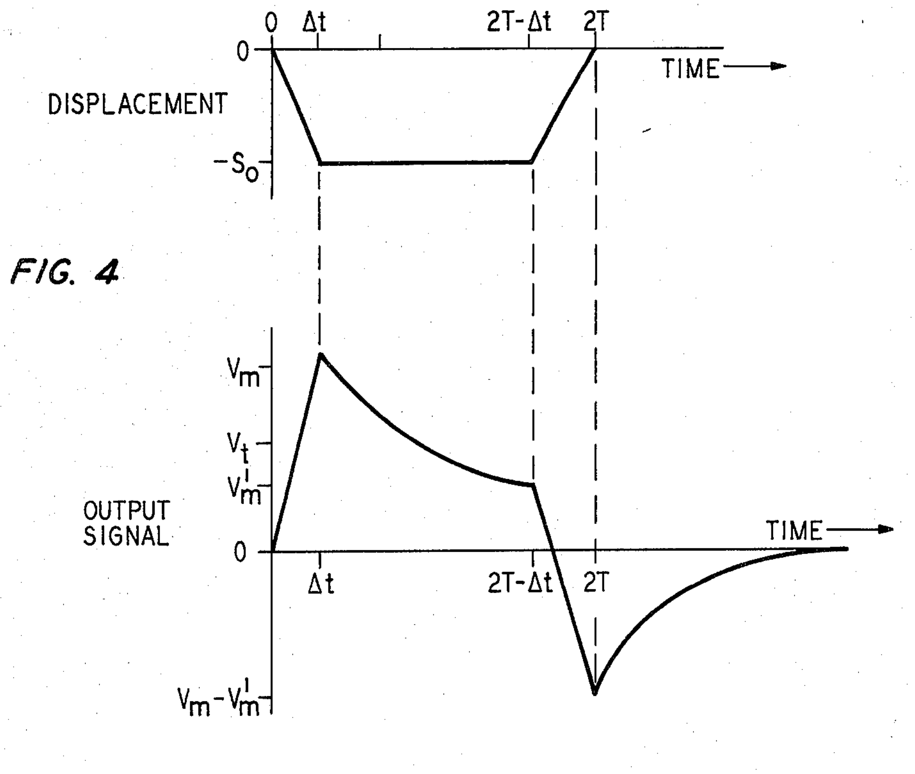
FIG. 4 illustrates the idealized displacement of an elemental area of a transducer constructed in accordance with the present invention and depicts the relationship between this displacement and the output signal of the elemental transducer area.

FIG. 4 depicts the electrical output signal of an elemental transducer as the writing stylus passes over the transducer surface. The tablet performance parameters and the structural constraints imposed in order to optimize performance are best understood by presenting the displacement in the output signal of FIG. 4 as a function of time where the stylus is assumed to move across the tablet writing surface with a uniform writing speed. As depicted in FIG. 4, the diaphragm displacement in the area of the element of interest may be ideally described as a trapezoidal function of time. Specifically, the time period $\Delta t$ is that amount of time required for the diaphragm to reach maximum displacement, $s_o$, when the stylus begins to exert pressure on the transducer element. During time period $\Delta t$ to $2T - \Delta t$, the diaphragm remains at maximum displacement $s_o$ which is normally equal to the air gap between the backplate and the elastic diaphragm. As the writing stylus leaves the elemental transducer, the diaphragm returns to its quiescent position. The return time is depicted in FIG. 4 as the time interval between $2T - \Delta t$ and 2T. This time is arbitrarily assumed to be equal to the initial displacement time $\Delta t$.

FIG. 4 also depicts the electrical output signal of the transducer element subjected to this displacement. During the time interval between $t = 0$ and $t = \Delta t$, the output voltage rises from zero to a maximum value of $V_m$ as the foil is initially depressed. In the time interval $\Delta t$ to $2T - \Delta t$, although the foil displacement is constant, the output voltage decreases to a value denoted as $V_m'$. The exponential decay to voltage $V_m'$ is determined by the RC time constant of the electrical circuit connected to the transducer element. At time $2T - \Delta t$, the output voltage decreases rapidly due to the decreased displacement of the diaphragm. During this release interval, the voltage does not return directly to zero, but tends to overshoot, producing a voltage of the opposite polarity. After time 2T, the output level exponentially decays to zero, with the time constant again determined by the RC time constant of the circuit connected to the transducer element.

It can be shown that the maximum output $V_m$ of each transducer element in an $n \times n$ array can be expressed for two limiting values of writing speed as $$\frac{V_m}{V_s} = \frac{-C_1}{nC_o}, \text{ for } \beta << 1 \quad (1)$$

and $$\frac{V_m}{V_s} = \left(\frac{-\Delta C C_1}{nC_o^2}\right)\frac{1}{\beta}, \text{ for } \beta >> 1 \quad (2)$$

In these equations the quantities $C_o$, $C_l V_s$, and $\Delta C$ are determined by the tablet structure. Specifically, $C_o$ is the capacitance of the elemental transducer at time $t = 0$ in FIG. 4; $C_1$ is the capacitance of the elemental transducer at time $t = \Delta t$; $\Delta C = \epsilon_0 A/s_o$, where $\epsilon_0$ is the permittivity of air; A is the overlapping area of the row and column strips which form the transducer element; and $s_o$ is the dimension of the quiescent air gap between the backplate and the diaphragm; and $$V_s = \frac{\delta D\, s_o}{\epsilon_o(D+\epsilon s_o)}$$

where D, $\delta$, and $\epsilon$ are the electret film thickness, the electret film charge density, and the electret film relative dielectric constant, respectively.

The quantity $\beta$, however, is not solely related to the tablet structure, but is representative of the dynamic performance. Specifically, this parameter is specified by the rise time of the diaphragm foil and can be expressed as $$\beta = \frac{\Delta t \Delta C}{2RCC_1},$$

where $\Delta C$ and $C_1$ are the structurally determined parameters given above; $\Delta t$ is the rise time shown in FIG. 4; R is the resistance of the external loading circuit; and $C=(nC_o+C_L)/2$, where $C_L$ is the capacitance of the external loading circuit.

In the absence of ridge structure 25, it has been discovered that the parameter $\beta$ is essentially proportional to the speed at which the stylus traverses the tablet surface. Thus, Equations (1) and (2) describe a bound or limit on the output performance. Specifically, Equation (1) demonstrates that for fast writing speeds the maximum output voltage $V_m$ is independent of writing speed, whereas Equation (2) demonstrates that at very slow writing speeds the maximum output voltage decreases, being inversely proportional to the writing speed itself. It can thus be realized that the sensitivity or threshold of the circuit apparatus which processes the transducer signals, e.g., signal conditioning unit 12 of FIG. 1, must be established in view of the slowest contemplated writing speed.

If the tablet structure is not properly controlled, slow writing speeds can degrade tablet performance in another manner which is readily discernable from FIG. 4. At very low writing speeds the traverse time $2T - \Delta t$ of FIG. 4 is substantial and consequently a substantial reverse overshoot voltage results as the stylus leaves the tablet element. This overshoot signal not only affects the signal appearing between that backplate strip and that diaphragm strip which form the particular transducer element, but due to the inherent coupling between the transducer elements, the signal appears as a cross-talk signal on other row and column strips.

It can be shown that the cross-talk signal can effectively be expressed in an $n \times n$ array as $$V_I = \frac{-V_T}{2n},$$

where $V_I$ is the cross-talk signal induced in nonactivated rows and columns and $V_T$ is the signal appearing in the activated row and column. It can be realized that in an application which utilizes the transducer output as a binary signal with the signal level $V_t$ of FIG. 4 representing a logical 1, the reverse overshoot will normally not be detrimental to that logic circuit connected to the energized tablet element, since such logic circuits are generally unaffected by a negative input signal. As can be seen by the cross-talk equation, however, the reverse overshoot signal coupled to the other rows and columns is reversed in polarity. Thus, if the cross-talk signal is of sufficient magnitude to activate those logic circuits associated with nonenergized rows and columns, error signals are produced. In accordance with this invention, two alternative methods are utilized to eliminate the detrimental cross-talk signals. In one embodiment of the invention, properly dimensioned ridges or separators, such as ridge structure 25 of FIG. 2, are utilized to reduce the dependence of rise-time ($\beta$) on the writing speed and thereby to maintain sufficient signal output at slow writing speeds.

Figure 7:
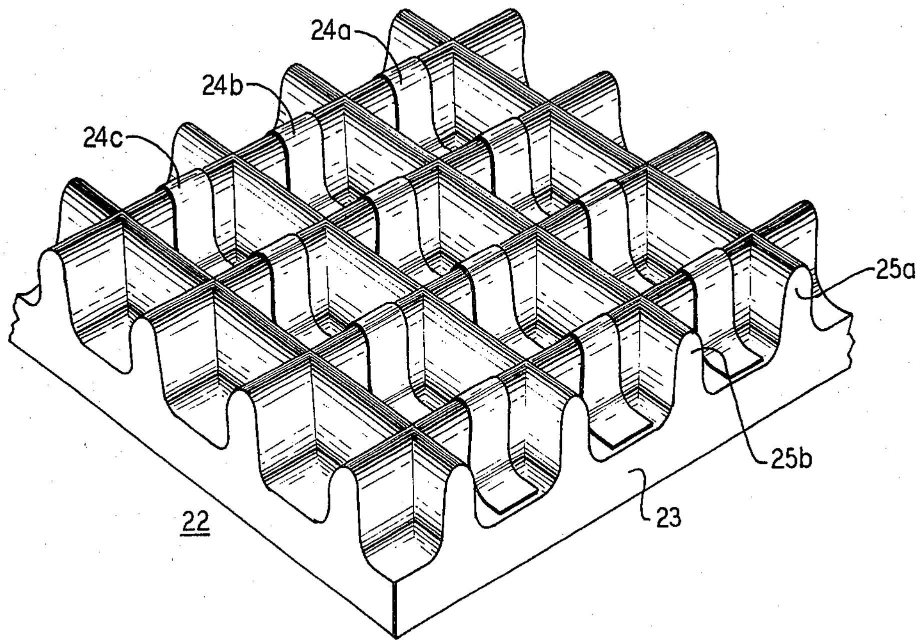
FIG. 7 is a detailed depiction of a portion of that embodiment illustrated in FIG. 6.
Figure 6:
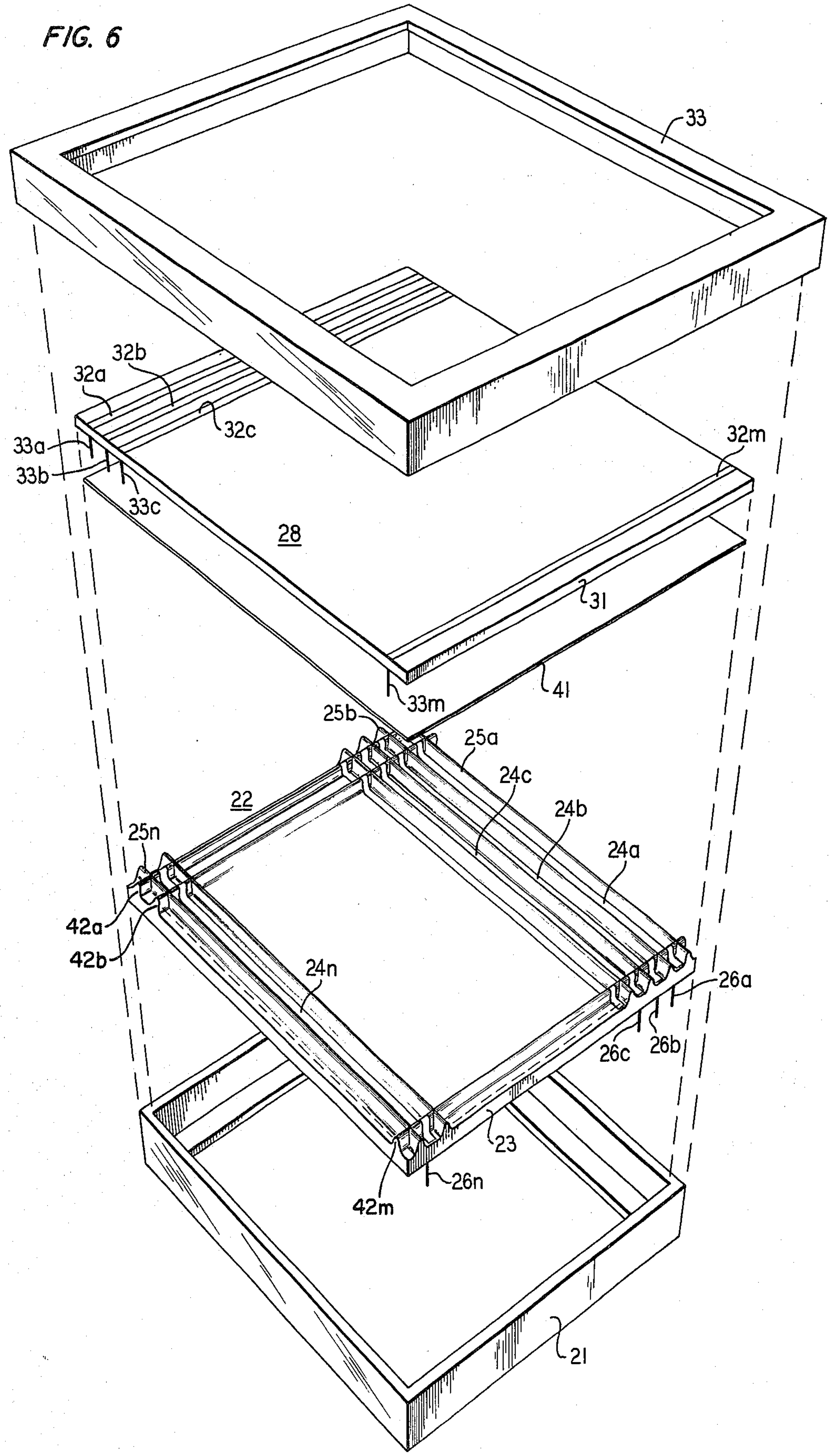
FIG. 6 is an exploded view of a second embodiment of this invention.

Specifically, it has been found that, if the height and width dimension of ridge structure 25 is approximately equal to 5 to 10 percent of the spacing dimension between the conductive backplate strips, satisfactory performance is obtained from the standpoint of both maximum output voltage and reverse polarity overshoot. It will be realized that ridges 25 in FIG. 2 separate the conductive strips of the backplate, but do not separate the conductive strips of the diaphragm. Thus the reverse polarity overshoot due to slow stylus motion which is parallel to ridges 25 may not be eliminated. If it is necessary to eliminate the reverse polarity overshoot for all stylus motion, a criss-cross pattern of ridges may be employed as depicted in FIGs. 6 and 7 and discussed hereinafter.

Figure 5:
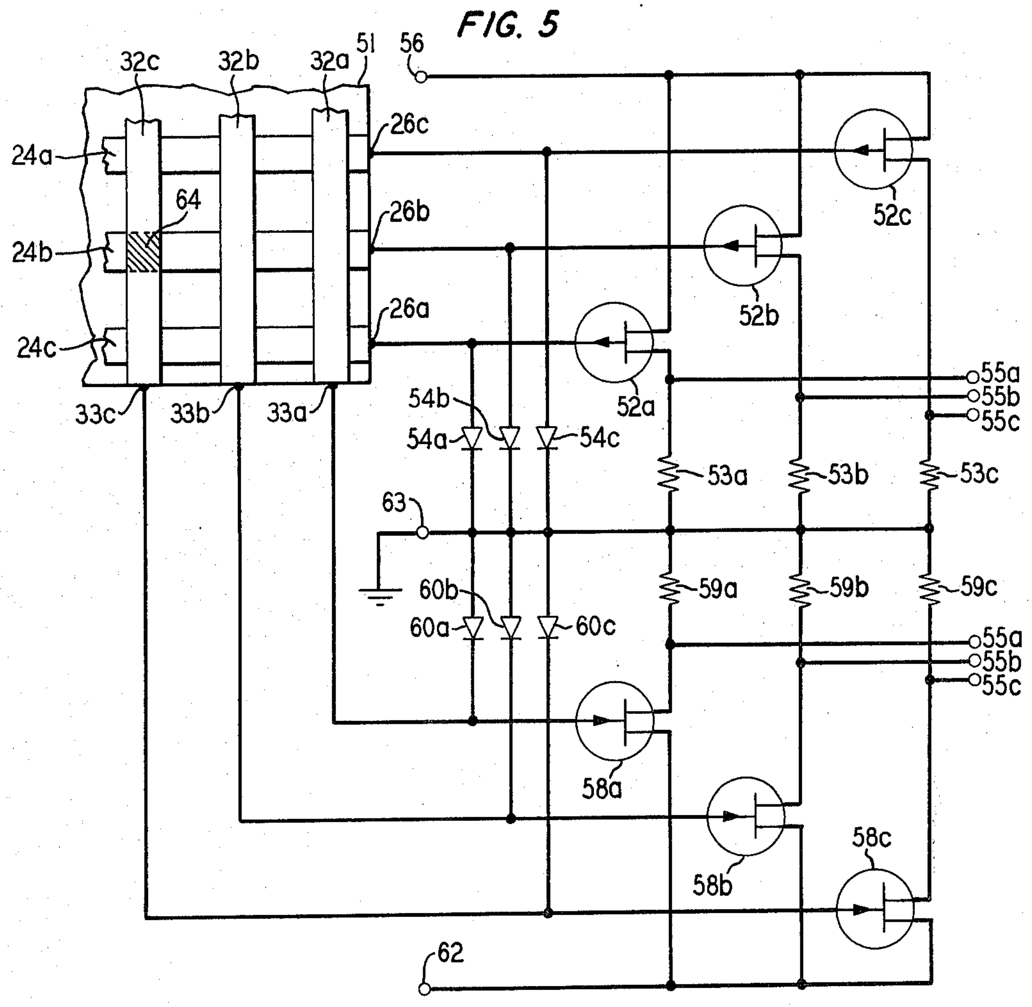
FIG. 5 is a partially pictorial, partially schematic depiction of a transducer which includes an electronic circuit to eliminate undesirable reversepolarity overshoot from the output signal of an activated transducer element.

FIG. 5 illustrates a second embodiment of the present invention which includes a circuit which eliminates reverse polarity overshoot, and thus elminates detrimental cross-talk, while also providing the necessary impedance transformation from the high output impedance of the transducer elements to an impedance level compatible with typical graphical communications systems. The circuit of FIG. 5 may be used independently or in combination with the ridge structures depicted in FIGS. 2 and 6. FIG. 5 depicts a portion of the tablet structure 51 in which the row and column metallizations, with the applicable electrical connections, are identified in the same manner as they are in FIG. 2. Basically, each row metallization 24 and each column metallization 32 is connected to a separate circuit which is effectively a field effect transistor source-follower circuit. It will be noted that each source-follower circuit connected to row metallization 24 comprises a P-channel transistor 52, a source load resistor 53, and a gate-source limiting diode 54. Each of the P-channel source-follower circuits is connected between bias terminal 56 and terminal 63, which is connected to the system common or ground potential of the graphic communications system.

The source-follower circuit associated with each column metallization 32 comprises an N-channel transistor 58, source load resistor 59, and gate-source limiting diode 60. Each N-channel source-follower circuit is connected between bias terminal 62 and graphic communications system ground terminal 63. The operation of the circuit may be best understood by assuming a particular transducer element, say the element defined by row metallization 24b and column metallization 32c (identified in FIG. 5 as element 64), is momentarily subjected to writing pressure as the stylus traverses the tablet surface.

The typical electrical signal developed between column metallization **32*c* and row metallization 24*b* is shown in FIG. 4B. Referring to FIG. 5, it can be readily observed that diodes 54*b* and 60*c* effectively form a voltage-divider between column metallization 32*c* and row metallization 24*b*. It should be recognized that FIG. 5 depicts the circuit connections for the embodiment in which the electret is charged such that column metallization 32 will be positive with respect to row metallization 24 during that portion of the activation time depicted as 0 to $2T - \Delta t$ in FIG. 4. Of course, if the electret is of the opposite charge characteristics, the circuit is connected such that all diodes are poled oppositely and opposite conductivity transistors are substituted for each transistors 52 and 58. With the connections as shown in FIG. 5, diodes 54***b* and 60*c* are reverse biased during time period 0 to $2T - \Delta t$ of FIG. 3, and significant gate-source voltages will be developed at both transistors 52*b* and 58*c*. Accordingly, output signals will be coupled to output terminals 55*b* and 57*c*.

It will be noted that during any interval of time in which a reverse polarity overshoot signal is present, diodes 54*b* and 60*c* are forward biased, effectively short circuiting the overshoot signal and thereby limiting the maximum negative voltage which may appear between a column and a row to the sum of the forward-biased voltage drops across diodes 54*b* and 60*c*. These diode drops can be controlled by proper choice of the diodes or by providing external diode bias voltages. The gate-to-source voltage of each transistor 52*b* and 58*c* thus is limited to substantially a single diode voltage drop. This gate-to-source voltage will not result in a noticeable output signal. Thus the circuit of FIG. 4 virtually eliminates reverse polarity overshoot and accordingly eliminates cross-talk while utilizing the well-known impedance transformation properties of source-follower circuits to provide the desired high impedance load for each transducer element.

It will be realized, by those skilled in the art, that FIG. 5 depicts a circuit in which field effect transistors 52 and 58 are enhancement mode metal oxide semiconductor (MOS) devices which are also known as insulated gate field effect transistors (IGFETs). It will be further recognized by those skilled in the art that circuits employing junction field effect transistors can alternately be employed by simply poling the diodes in the proper manner and providing appropriate bias potentials between both bias terminal 56 and 62 and system ground terminal 63. Regardless of the type of transistor employed, it will be recognized that a circuit constructed in accordance with FIG. 5 provides a unipolar voltage divider for coupling the desired polarity of the transducer output signal to the follower circuit while simultaneously limiting that polarity of the transducer output signal caused by reverse polarity overshoot to a level which cannot cause appreciable cross-talk signals which can interfere with the system's operation.

FIG. 6 is an embodiment of the present invention which illustrates the use of a criss-cross pattern or rectangular matrix of ridges to eliminate reverse polarity cross-talk regardless of the direction of stylus travel and also depicts the use of a compliant media 41 between elastic diaphragm 28 and conductive backplate 22. The inclusion of compliant media 41 results in an output signal proportional to stylus pressure. Thus the output signals of a graphic tablet constructed in such a manner not only indicate the position of the writing stylus as it moves across the writing surface, but also indicate the magnitude of the writing pressure exerted at each point. The addition of this output information effectively adds another dimension to the output signal which can have added value in applications such as the verification of signatures.

The use of a centrally located computer to record commercial transactions is a growing practice, but prior art computer credit systems have generally provided only a method of verifying the validity of the transaction by the credit card number. Thus a fraudulent transaction, taking place before a credit card has been reported lost or stolen, may not be detected. In a graphic communications system employing a transducer such as depicted in FIG. 6, however, a centrally located computer is provided not only with the two-dimensional signature information, but also with the signature "coloration" or writing pressure used in making that signature. Thus an extremely accurate signature verification can be achieved.

In FIG. 6 those structural elements substantially identical to the elements of FIG. 2 have been labeled with the identifiers utilized in FIG. 2.

Ridge structure 42 is a lattice-like structure with substantially rectangular interstitial spaces. Ridges 42*a* through 42*m*, spaced to separate the diaphragm conductive strips 32*a* through 32*m*, are arranged perpendicular to ridges 25*a* through 25*n* to prevent reverse polarity overshoot due to slow stylus movement parallel to ridges 25. Thus, ridges 25 and 42 define a lattice-like structure with substantially rectangular interstitial spaces. This ridge structure can be an integral part of insulating material 23 as depicted in FIGS. 6 and 7, in which case conductive strips 24 are formed over ridges 42, or, alternatively, ridges 25 and 42 may be a separate ridge-like structure or a nonconductive material deposited on backplate 22 after the formation of conductive strips 24. In any case, this ridge structure is constructed so that when the tablet is assembled, metallized strips 24 and 32 lie within the interstitial spaces of the ridge structure. A portion of backplate 22 in an embodiment which utilizes metal strips deposited after the formation of ridges 25 and 42 is depicted in FIG. 7.

In FIG.. 6, compliant sheet 41 is formed of a compliant material, such as rubber, being essentially the same size as backplate 22 and substantially the same thickness as the spacing between the backplate and the elastic foil 28. It will be understood that compliant sheet 41 is selected so that the compliance of the material imparts the desired force-voltage relationship between the writing pressure and the output voltage of the transducer. That is, compliant sheet 41, which effectively occupies the interstitial spaces of the assembled transducer, is selected to impart a substantially linear relationship between the transducer element output voltage and normal handwriting pressures. It should be recognized that several alternative compliant medias are available. For example, compliant sheet 41 can be replaced by a suitably selected dielectric jell or grease or by small particles of compliant material deposited within the interstitial spaces of ridge structure 25. It will be further understood that in embodiments utilizing such a compliant media the communications system contains provision for encoding the elemental output voltage magnitude along with the positional information for transmission to the remote facility. This encoding, of course, may be accomplished by any number of conventional means. For example, if the graphic communications system employs a binary encoded digital word, a binary representation of the magnitude of the transducer element output voltage may be obtained by conventional analog-digital conversion and this digital representation included within the encoded word.

What is claimed is:

1. Graphic communications apparatus comprising:

an electret film selectively metallized on one surface thereof, said electret film locally deformable in response to the pressure of a writing stylus;

a rigid backplate selectively metallized on one surface thereof, said backplate mounted in spaced juxtaposition with said electret film so that said metallized areas of said backplate are in spaced juxtaposition with said metallized areas of said electret film;

a plurality of ridge means dimensioned for decreasing the rise time of said electret film to improve performance at low writing speeds by reducing the amplitude of the reverse polarity overshoot signal, each of said ridge means interposed between the metallized regions of said backplate; and means for connecting the metallized areas of said electret film and said backplate to a plurality of output terminals.

2. The graphic communications apparatus of claim 1 further comprising a compliant layer interposed between said backplate and said electret film, said compliant layer having a compliance which imparts a substantially linear relationship between the deformation of said electret film and the electrical output signal of said graphic communications apparatus.

3. The graphic communications apparatus of claim 1 wherein said electret film and said backplate are selectively metallized with a plurality of substantially parallel strips, said electret film mounted with the parallel strips thereon substantially perpendicular to the parallel strips on said backplate.

4. The graphic communications apparatus of claim 3 wherein said means for connecting said metallized strips to said plurality of output terminals includes a plurality of diodes, a first electrode of each diode commonly connected to a common output terminal, and the second electrode of each diode connected to a single one of said metallized strips of said backplate and said electret film.

5. The graphic communications apparatus of claim 4 wherein those diodes connected to said metallized strips of said backplate are poled oppositely to those diodes connected to said metallized strips of said electret film.

6. The graphic communications apparatus of claim 5 further comprising:

a plurality of N-channel field effect transistor source-follower circuits, each of said N-channel source-follower circuits including an N-channel field effect transistor and a resistor, the first electrode of said resistor connected to the source electrode of said N-channel transistor, the second electrode of said resistor connected to said common output terminal, the drain electrode of said N-channel transistor connected to a first source of fixed potential, and the gate electrode of said transistor connected to one of said output terminals, each of said output terminals connected to said gates of said N-channel transistors connected to one of said like-poled diodes; and a plurality of P-channel field effect transistor source-follower circuits, each of said P-channel source-follower circuits including a P-channel field effect transistor and a resistor, the first electrode of said resistor connected to the source electrode of said P-channel transistor, the second electrode of said resistor connected to said common output terminal, the drain electrode of said P-channel transistor connected to a second terminal of fixed potential, the gate electrode of said P-channel transistor connected to a single one of said output terminals, each of said output terminals connected to one of said diodes of opposite poling to those diodes connected to said gates of said N-channel transistors.

7. A transducer for electrically indicating the position of a writing stylus upon the surface of said transducer comprising:

an elastically deformable electret film, one surface thereof selectively metallized with a plurality of equally spaced parallel conductive strips;

a nonconductive backplate with a plurality of equally spaced parallel conductive strips upon one surface thereof;

a nonconductive rectangular array of ridges, said ridges forming a plurality of substantially rectangular interstitial spaces, said ridges having a height and width between 5 and 10 per cent of the spacing dimension between the metallized strips of said backplate;

means for supporting said electret film in juxtaposition with said backplate such that said metallized strips of said electret film are substantially perpendicular to said metallized strips of said backplate with said ridge structure interposed between said electret and said backplate, the individual ridges of said array of ridges contacting said electret film and said backplate between adjacent ones of said conductive strips; and means for electrically connecting said conductive strips of said backplate and said conductive strips of said electret film to a plurality of output terminals.

8. The transducer of claim 7 further comprising a compliant media which substantially occupies said interstitial spaces of said rectangular array of ridges, said compliant media having a compliance which imparts a linear relationship between the writing pressure exerted by said writing stylus and the magnitude of the electrical output signal of said transducer.

9. A graphic communications system comprising:

trandsucer means for producing electrical signals indicative of the position of a writing stylus upon the surface of said transducer including an electret film with substantially parallel conductive strips on one surface thereof, said electret film mounted in fixed juxtaposition with a nonconductive backplate having a plurality of conductive strips on the surface thereof nearest said electret film, said parallel conductive strips of said electret film oriented substantially perpendicular to said parallel conductive strips of said backplate;

first detection means connected between said conductive strips of said electret film and a terminal of fixed potential, said first detection means responsive to a signal of a first polarity for determining the first positional coordinate of said writing stylus upon said surface of said transducer;

second detection means connected between said conductive strips of said backplate and said terminal of fixed potential, said second detection means responsive to a signal of second polarity for determining the second positional coordinate of said writing stylus upon said surface of said transducer; and transmission means for supplying said first and second positional coordinate to remote apparatus for utilization therein.

10. The graphic communications system of claim 9 wherein said transducer means further includes a compliant layer interposed between said electret film and said nonconductive backplate; and said graphic communications system further comprises third detection means for determining the amplitude of each signal detected by said first and second detection means.

* * * * *